(12) United States Patent
Lee et al.

(10) Patent No.: US 6,658,151 B2
(45) Date of Patent: Dec. 2, 2003

(54) EXTRACTING INFORMATION FROM SYMBOLICALLY COMPRESSED DOCUMENT IMAGES

(75) Inventors: Dar-Shyang Lee, Union City, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/289,772

(22) Filed: Apr. 8, 1999

(65) Prior Publication Data

US 2002/0150300 A1 Oct. 17, 2002

(51) Int. Cl.[7] .................................................. G06K 9/72
(52) U.S. Cl. ....................... 382/229; 382/160; 382/177; 382/228; 382/232; 707/4; 707/9; 707/10
(58) Field of Search ................................. 382/155–156, 382/159–160, 177, 224–225, 228–232, 235, 244; 707/5, 102; 704/1, 2, 9, 10

(56) References Cited

U.S. PATENT DOCUMENTS

| | | | |
|---|---|---|---|
| 4,610,025 A | | 9/1986 | Blum et al. |
| 5,062,143 A | * | 10/1991 | Schmitt ........................ 382/230 |
| 5,418,951 A | | 5/1995 | Damashek |
| 5,452,442 A | * | 9/1995 | Kephart ........................ 714/38 |
| 5,467,425 A | * | 11/1995 | Lau et al. .................... 704/243 |
| 5,752,051 A | | 5/1998 | Cohen |
| 5,809,172 A | * | 9/1998 | Melen .......................... 382/232 |
| 5,809,476 A | * | 9/1998 | Ryan ............................... 705/2 |
| 5,982,929 A | * | 11/1999 | Han et al. ..................... 382/200 |
| 6,011,905 A | * | 1/2000 | Huttenlocher et al. ........ 358/1.2 |
| 6,038,342 A | * | 3/2000 | Bernzott et al. ............. 382/173 |
| 6,052,481 A | * | 4/2000 | Grajski ........................ 382/187 |
| 6,088,484 A | * | 7/2000 | Mead ........................... 382/232 |
| 6,092,038 A | * | 7/2000 | Kanevsky ....................... 704/9 |
| 6,118,899 A | * | 9/2000 | Bloomfield et al. ......... 382/233 |
| 6,157,905 A | * | 12/2000 | Powell ........................... 704/2 |
| 6,617,369 B2 | * | 12/2000 | Schulze ........................... 704/9 |
| 6,169,969 B1 | * | 1/2001 | Cohen ........................... 704/10 |
| 6,311,152 B1 | * | 10/2001 | Bai et al. ........................ 704/9 |

* cited by examiner

Primary Examiner—Bhavesh M. Mehta
Assistant Examiner—Gregory Desire
(74) Attorney, Agent, or Firm—Blakely, Sokoloff, Taylor & Zafman LLP (57) ABSTRACT

A method and apparatus for extracting information from symbolically compressed document images. A deciphering module generates first and second text strings by deciphering respective sequences of template identifiers in first and second symbolically compressed document images. A conditional n-gram module receives the first and second text strings from the deciphering module and extracts n-gram terms therefrom based on a predicate condition. A comparison module generates a measure of similarity between the first and second symbolically compressed document images based on the n-gram terms extracted by the conditional n-gram module.

41 Claims, 7 Drawing Sheets

EXTRACTING INFORMATION FROM SYMBOLICALLY COMPRESSED DOCUMENT IMAGES

The present invention relates to the field of document image processing, and more particularly to processing document images that have been symbolically compressed.

BACKGROUND OF THE INVENTION

Storage and transmission of electronic document images have become increasingly prevalent, spurring deployment and standardization of new and more efficient document compression techniques. Symbolic compression of document images, for example, is becoming increasingly common with the emergence of the JBIG2 standard and related commercial products. Symbolic compression techniques improve compression efficiency by 50% to 100% in comparison to the commonly used Group 4 compression standard (CCITT Specification T.6). A lossy version of symbolic compression can achieve 4 to 10 times better compression efficiency than Group 4.

In symbolic compression, document images are coded with respect to a library of pattern templates. Templates in the library are typically derived by grouping (clustering) together connected components (e.g., alphabetic characters) in the document that have similar shapes. One template is chosen or generated to represent each cluster of similarly shaped connected components. The connected components in the image are then represented by a sequence of template identifiers and their spatial offsets from the preceding component. In this way, an approximation of the original document is obtained without duplicating storage for similarly shaped connected components. Minor differences between individual components and their representative templates, as well as all other components which are not encoded in this manner, are optionally coded as residuals.

Many document management activities, such as document classification, duplicate detection and language identification, are based on the semantic content of document images. Consequently, in traditional document management systems, compressed document images are first decompressed then subjected to optical character recognition (OCR) to recover the semantic information needed for classification, language identification and duplicate detection. In the context of a database of symbolically compressed document images, the need to decompress and perform OCR consumes considerable processing resources. Also, because OCR engines are usually limited in the number and variety of typefaces they recognize, recovery of semantic information through conventional OCR techniques may not be possible for some symbolically compressed documents.

SUMMARY OF THE INVENTION

A method and apparatus for extracting information from symbolically compressed document images are disclosed. An input document image is represented by a sequence of template identifiers to reduce storage consumed by the input document image. The template identifiers are replaced with alphabet characters according to language statistics to generate a text string representative of text in the input document image. In one embodiment, the template identifiers are replaced with alphabet characters according to a hidden Markov model. Also, a conditional n-gram technique may be used to obtain indexing terms for document matching and other applications.

These and other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to embodiments described herein, semantic information is extracted directly from a symbolically compressed document image by treating the sequence of template identifiers in the compressed document image as a substitution cipher and deciphering the substitution cipher, preferably based on hidden Markov modeling. By this approach, a text representation of a symbolically compressed document image is generated based on the symbol sequence identified during the compression process itself and without having to perform decompression and OCR operations. Because the text recovered from the compressed document image is based on language statistics, it represents a probabilistic estimate of the text in the original document image and therefore is usually not error free. Nevertheless, the text representation may be used for numerous document processing operations that do not require perfect reproduction, including language identification, document matching (e.g., for duplicate detection and other purposes) and document classification.

Symbolic Compression

In symbolic compression, components in a document image are grouped and coded by a single integer assigned to each cluster of similar patterns to avoid wasting bandwidth in storing duplicated bitmaps. The integers are also roughly sorted in reading order to reduce entropy in the offsets. As discussed below, both measures aimed at improving the compression ratio also facilitate application of deciphering techniques to compressed document processing. The phrase "document image" is used throughout the following description and refers to a digital image of a sheet of paper or similar medium having text printed thereon.

Figure 1:
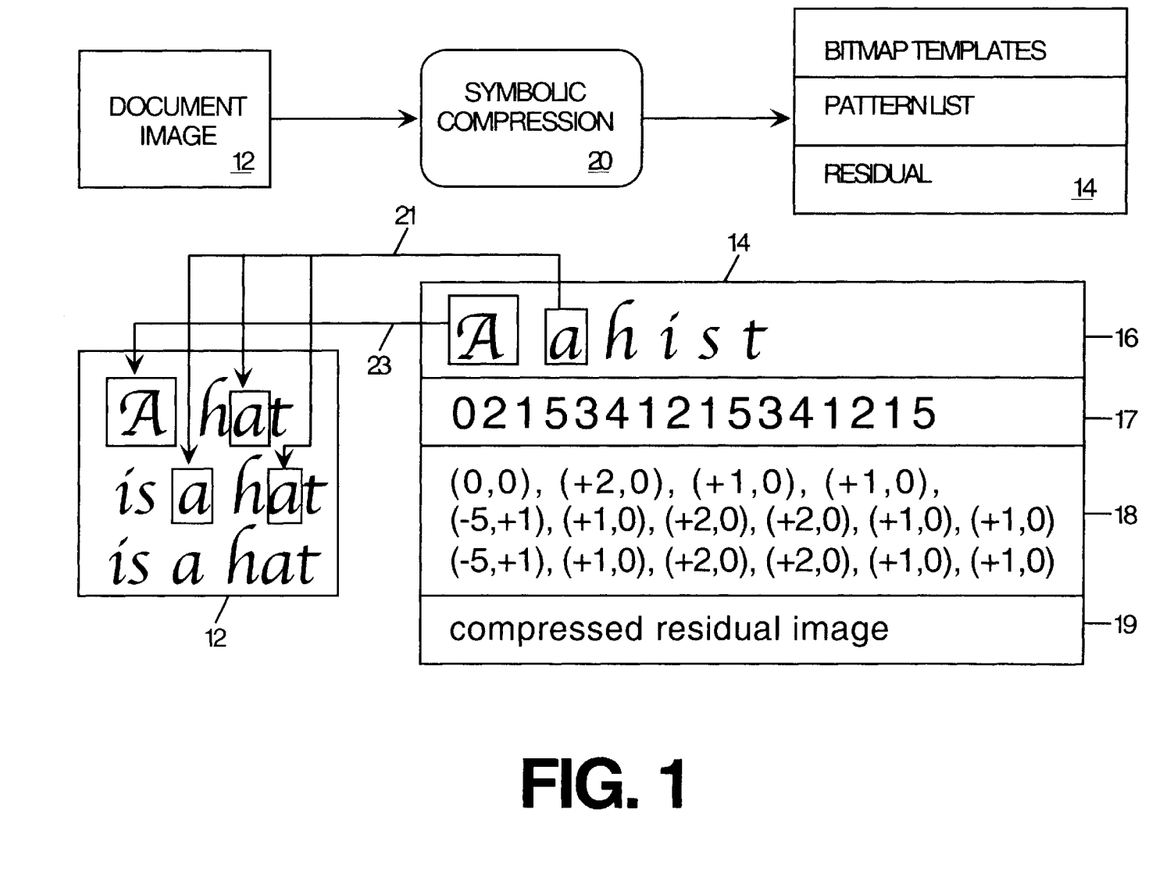
FIG. 1 illustrates symbolic compression of a text image.

FIG. 1 illustrates symbolic compression of a document image 12 that contains the text string "A hat is a hat is a hat." Connected components (i.e., groups of touching black pixels) are identified and clustered according to their similarities. In the document image 12, for example, sixteen connected components are identified (one for each alphabetic character in the text) and clustered into six different clusters (one for each unique alphabetic character). Arrows 21 and 23 illustrate the correspondence between clustered components in the input image 12 (e.g., a cluster of five 'a's represented by the template 'a', and a cluster of one 'A' represented by the template 'A').

The sequence of clustered components in the document image 12 is processed by a symbolic compression system 20 into a symbolically compressed representation 14 that includes a set of bitmap templates 16 having template identifiers 0–5, respectively; a sequence of template identifiers 17, representing the sequence of occurrence of the bitmap templates in the original image; a relative geometric offset for each connected component 18 (e.g., (+2, 0) indicates that a component is two pixels (or other units) to the right and zero pixels down from a previous component); and a compressed residual image 19. The residual image is the difference between the original image and the bitmap templates. This data can be compressed with arithmetic coding or another technique. Also, a lossy representation for a symbolically compressed image could be obtained by dropping the residual image altogether. Symbolic compression techniques are also used in some multilayered compression formats for color documents.

As it turns out, the symbolic compression format is particularly useful for extracting semantic information. Clusters of connected components that are approximately the size of characters can be assumed to be characters. Also, by treating the sequence of template identifiers as a substitution cipher, it becomes possible to apply a deciphering technique to extract character interpretations. Herein the feasibility of recovering plain text directly from symbolically compressed document images by solving a substitution cipher is demonstrated. Also, a new solution to the substitution cipher problem using hidden Markov models (HMM) is described.

In the example shown in FIG. 1, with the exception of the capital 'A,' there is a one-to-one correspondence between bitmap templates and English alphabetic characters. This is an ideal case known as a simple substitution cipher. If each template identifier is replaced by its corresponding alphabetic character, "a" for 1, "h" for 2, and so on, the original message can be recovered from the sequence of component identifiers. In practice, however, multiple templates can be formed for a single alphabetic symbol, as in the case of upper and lower case "a". This results in a many-to-one homophonic substitution cipher. In an even more realistic scenario, a single pattern could correspond to a partial symbol or multiple symbols due to image fragmentation and segmentation errors.

Markov Modeling

To appreciate the application of a hidden Markov model to the substitution cipher problem, it is helpful to understand Markov modeling generally. Markov models have traditionally been used for modeling natural languages and include two major components: a set of labeled states and a probability distribution that governs the transitions among the states. Different probability distributions apply for different languages. A Markov process generates a sequence of labels by starting at a state according to some initial probability, outputting the state's label, and then moving to another state, possibly the same, selected according to the transition probabilities of the current state. The process is then repeated at the next state. When the states and transition probabilities are properly configured according to the statistics of a given language, sequences of labels thus generated bear similar characteristics of the language, with the individual labels corresponding to alphabetic characters in the language. In an $k^{th}$ order Markov process, the probability of being at a state at any given time is dependent only on the previous k states. Due to the exponential number of transition probabilities required, only low order Markov models are used in practice.

Although low order Markov models can not fully represent all syntactic aspects of a language such as grammars and spellings, they do provide a compact and well defined language source from which further analysis can be derived. While Markov models explicitly associate each state with a fixed observable label, hidden Markov models ("HMM") introduce an additional layer of abstraction by allowing one of a set of labels to be produced at each state. State traversals in a hidden Markov model follow the same process as in a Markov model. However, instead of producing a fixed label at a given state, one of a set of labels is produced according to the symbol probabilities associated with that state. Thus, there is no explicit correspondence between the sequence of states traversed and the sequence of labels observed, hence the name hidden Markov model. The matter of how to determine the symbol production distribution without explicit knowledge of the states traversed is a fundamental problem in the theory (see, for example, "An Introduction to Hidden Markov Models," L. R. Rabiner and B. H. Juang, IEEE ASSP Magazine, pp. 4–16, January 1986). The training algorithm seeks to maximize the probability of observing the symbol sequence under model constraint.

Considering the Markov process of state traversal as a language source from which a particular plain text message can be generated with some probability, then the added symbol production at the traversed states in a HMM describes the enciphering process of a substitution cipher, where each letter in plain text is replaced with a cipher symbol one at a time. This analogy between the source language modeling as a Markov process and the representation of the enciphering function by symbol probabilities is the basis for solving substitution ciphers using a HMM. The state probabilities are initialized with language statistics, and the symbol probabilities are estimated with the expectation maximation ("EM") algorithm. Other techniques may be used to estimate symbol probabilities in alternate embodiments.

Solving a Substitution Cipher Using a Hidden Markov Model

Consider a first order Markov process with states representing alphabetic characters A through Z whose initial and transition probabilities are initialized with unigram and conditioned bigram statistics of English. (As an aside, conditioned bigram statistics refers to the probability of seeing a letter $\beta$ given the previous letter $\alpha$. For example, prob(u|q)=1 because "q" is always followed by "u" in English.) Then sequences of states traversed according to the assigned probabilities would resemble English text, at least to the extent that both have similar letter and letter pair frequencies. Conversely, a passage of English text would correspond to a sequence of state traversals. Maintaining this structure, however, instead of observing labels on the states, cipher symbols produced by the states are observed. If the underlying plain text is known (or equivalently the states traversed) the symbol probabilities can be determined for all states visited. Without the knowledge of the state sequence, hidden Markov learning provides a mechanism to estimate the symbol probabilities by maximizing the probability of observing the symbol sequence.

In a first order hidden Markov model, there are n states in the model, each representing a letter in the plain text alphabet. Associated with each state, $\alpha$, is a state transition probability, $A_\alpha$, and a symbol probability, $P_\alpha$. The first state in a sequence is selected according to an initial probability, $I\alpha$. Subsequent states are generated according to the transition probabilities, outputting one of the symbols $\{c_1, c_2, \ldots, c_m\}$ at each state with distribution $P_\alpha(c_1)$. The transition probability from state $\alpha$ to state $\beta$ can be calculated from the bigram frequencies that character $\alpha$ is followed by character $\beta$. That is, $A_\alpha(\beta)=\text{Prob}(\beta|\alpha)$. The initial state probability $I\alpha$ is simply the character frequency of $\alpha$. Both the initial and transition probabilities are estimated from a corpus of the source language and remain fixed, providing a first order Markov modeling of the source language. The only parameters being estimated is the symbol probabilities $P_\alpha$. Let $P_\alpha^{(t)}(c_i)$ be the probability estimation at iteration t that symbol $c_i$ will be produced at state $\alpha$, then a new estimate is obtained by $$P_\alpha^{(t+1)}(c_i) = \frac{\sum_{k=1}^{L} \gamma_k^{(t+1)}(\alpha) \big|_{s_k=c_i}}{\sum_{k=1}^{L} \gamma_k^{(t+1)}(\alpha)}, \quad \text{where } \gamma_k^{(t+1)}(\alpha) = \frac{F_k^{(t+1)}(\alpha) B_k^{(t+1)}(\alpha)}{\sum_{\beta \in A} F_k^{(t+1)}(\beta) B_k^{(t+1)}(\beta)}$$

$F_k(\alpha)$ and $B_k(\alpha)$ are computed recursively from the first and last symbol in the sequence, respectively, toward the opposite end. For this reason, they are usually referred to as the forward and backward probabilities.

In one embodiment, the symbol probabilities are initialized according to the following:

$$P_\alpha^{(0)}(c_i) = \frac{P_i^{(0)}(\alpha) \text{Prob}(c_i)}{\sum_{j=1}^{m} P_j^{(0)}(\alpha) \text{Prob}(c_j)}$$

Intuitively, if the integer 15 appeared only once in a sequence of 1000 integers, then "15" is unlikely to be letters 'a' or 'e' because far more occurrences of those letters would have been expected in the source text. Thus, the symbol probabilities are initialized based the number of occurrences of an integer in the cipher text and the expected frequency of a letter in English, using a binomial distribution.

Figure 2:
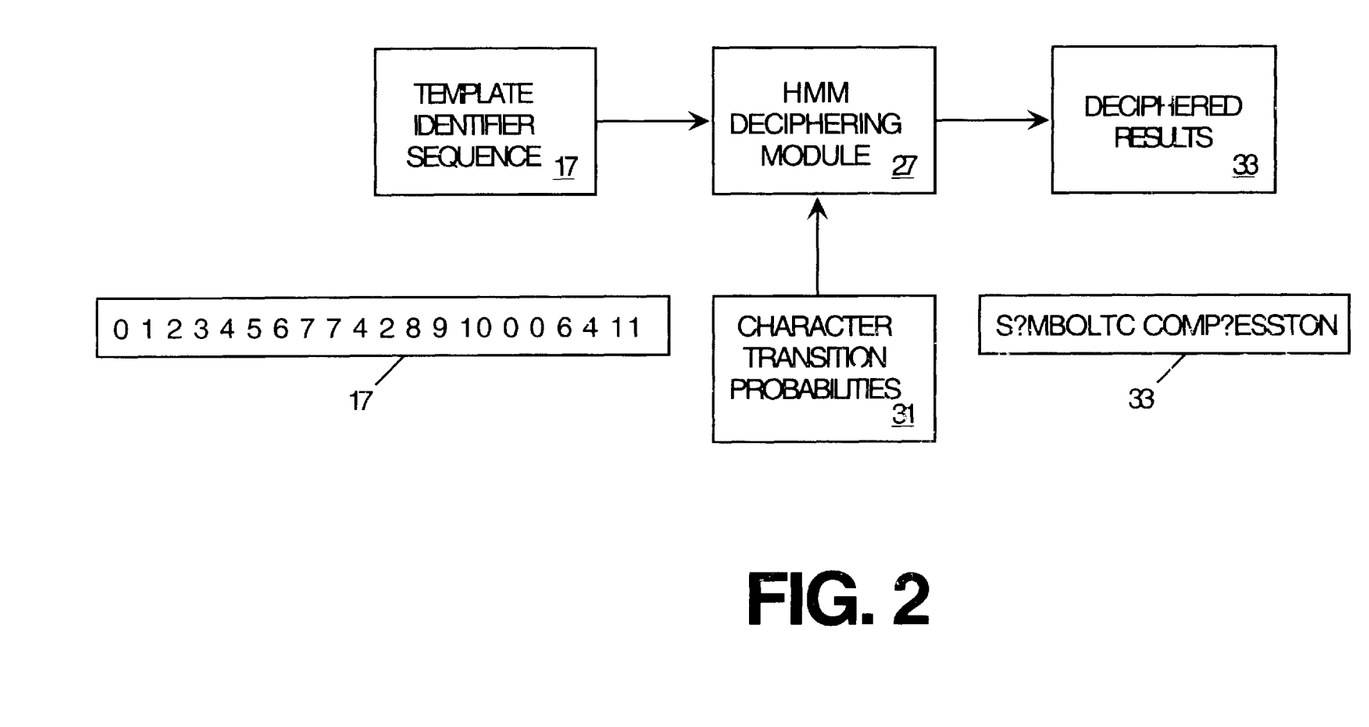
FIG. 2 illustrates an HMM-based deciphering system according to one embodiment.

FIG. 2 illustrates an HMM-based deciphering system according to one embodiment. A template identifier sequence 17 is obtained from a symbolically compressed document image and input to a HMM deciphering module 27. The HMM deciphering module applies character transition probabilities 31 as expressed analytically above to generate deciphered results 33. The deciphered results 33 may not be completely correct. However, they are often adequate for various document processing tasks which are described below.

There are several reasons why the deciphered results 33 will be less than perfect. First, as alluded to above, the deciphering problem is rarely one of simple substitution. For example, the presence of upper and lower case letters and multiple typefaces lead to more than one template per alphabetic symbol. Imaging defects and segmentation problems further complicate the template-to-symbol mapping. In addition, short sequences and rare patterns usually do not posses sufficient statistics for deciphering. Even with ample exemplars, certain contents such as numeric strings often cannot be deciphered due to lack of context. Nevertheless, sufficient information can often be recovered for useful document processing tasks including, without limitation, language identification, duplicate detection, document classification and others.

Although HMM-based deciphering is preferred, other techniques for solving the substitution cipher represented by the sequence of template identifiers may be used in alternate embodiments. Such techniques include, but are not limited to relaxation, dictionary pattern matching, and optimization techniques.

Figure 3:
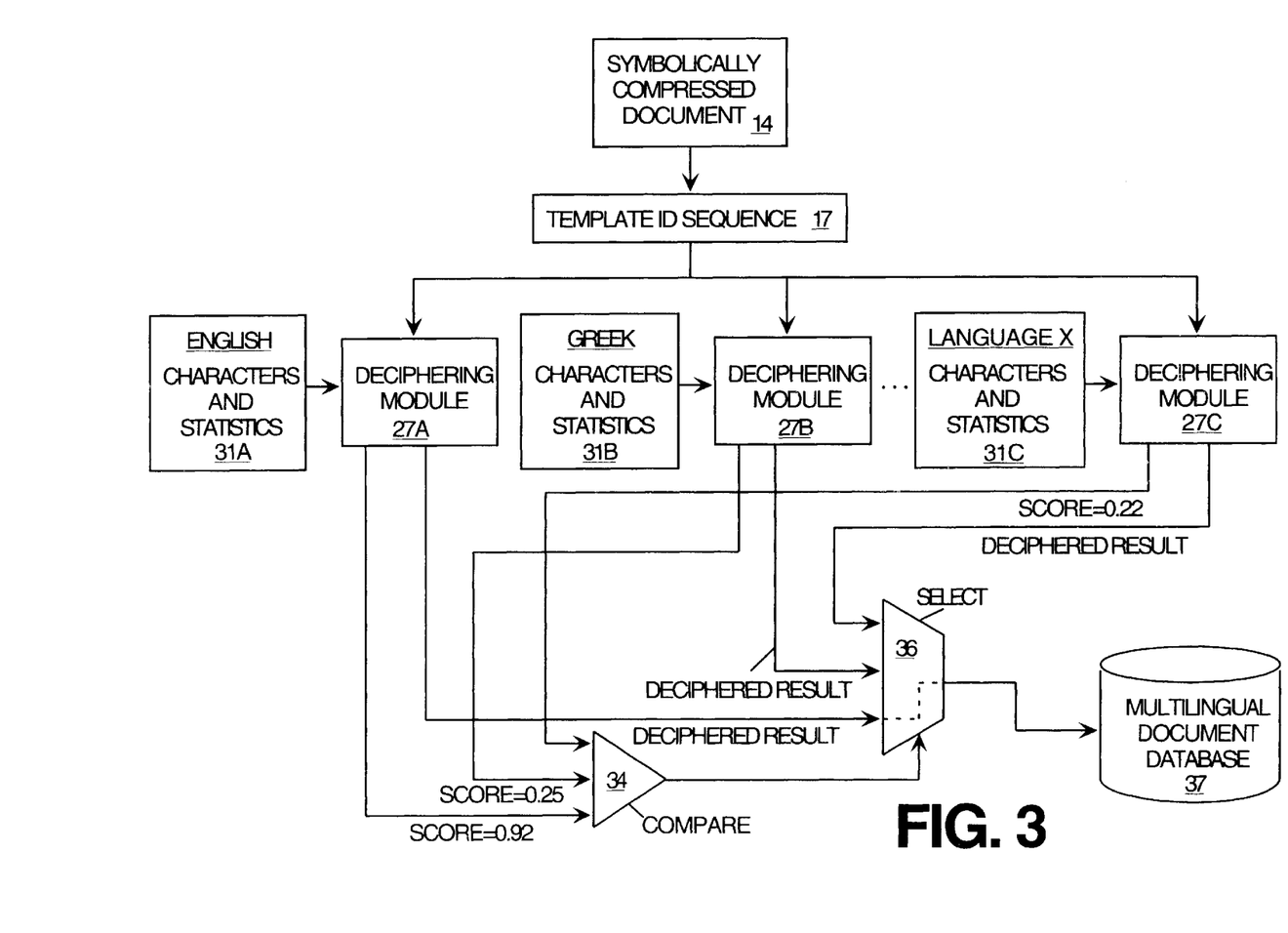
FIG. 3 illustrates using HMM-based deciphering to simultaneously decipher and identify the language of a symbolically compressed document in a multilingual setting.

FIG. 3 illustrates using HMM-based deciphering to simultaneously decipher and identify the language of a symbolically compressed document in a multilingual setting. The template identifier sequence 17 extracted from a symbolically compressed document 14 is concurrently deciphered in parallel HMM-based deciphering modules 27A–27C that have been initialized according to statistics of different languages 31A–31C. In one embodiment, each HMM-based deciphering module 27A–27C produces both a deciphered result and a confidence score that represents how well the template identifier sequence 17 corresponds to the statistics of the language model. The confidence scores produced by the different HMM-based deciphering modules 27A–27C are compared (shown graphically by comparator 34) and the language used to initialize the HMM-based deciphering module that yielded the highest confidence score is selected as the most probable language of the original document. The identified language and its corresponding text interpretation are used to access the multilingual document database 37. In the example of FIG. 3, the English-language-initialized deciphering module 27A produced a confidence score of 0.92, while the other deciphering modules produces significantly lower confidence scores of 0.25 and 0.22. Thus, the symbolically compressed document is deemed to be an English language document and, as graphically illustrated in FIG. 3, the English language deciphered result is selected by selector 36 to access the multilingual document database 37.

The above-described language identification technique demonstrates an advantageous aspect of using language statistics to extract plain text from symbolically compressed documents, namely, the adaptability of the technique to new languages. By specifying the character set of the language and some measure of the language statistics (e.g., by supplying a training text), the HMM-based deciphering technique may readily be adapted for use with new languages.

Document Matching Using Deciphered Results

According to one embodiment an n-gram technique is applied to an HMM deciphered result to extract information for document matching. An n-gram is a sequence of alphabet characters (e.g., a bigram is a sequence of two characters, a trigram is a sequence of three characters and so forth). An n-gram approach to measuring the similarity of two documents typically extracts all sequences of n consecutive characters from each document. The similarity of the documents is represented by a function of the number of n-grams they have in common.

Because n-gram-based techniques tend to be error-tolerant and language-independent, they are particularly suitable for information extraction from partially deciphered character interpretations. However, while regular n-grams may provide a robust solution to information retrieval, they do not present an effective indexing scheme for applications that involve document matching. Redundancy in the n-gram technique results in a large number of indexing terms and the converging behavior of n-gram statistics blurs distinctions between individual documents. Densely clustered documents of similar contents decrease the error tolerance of the indexing method for finding any particular document. This tendency towards language mean is further accentuated by the HMM-based deciphering process which interprets the document in a way that best fits the language mean. One solution to such problems is to use higher order n-grams (i.e., larger values of n) in an effort to obtain more effective indexing terms. Unfortunately, memory consumption and computation requirements increase substantially with each increment in n-gram order.

According to one embodiment, a modified n-gram, referred to herein as a "conditional" n-gram, is used to generate document indexing terms. A conditional n-gram is a form of folding the dimensions of high order n-grams. When appropriately defined conditions are used, conditional n-grams can eliminate some of the redundancies in conventional n-grams to obtain more effective indexing terms and a more uniformly distributed document space.

Conditional n-grams are generated from consecutive characters that satisfy a predicate condition. For example, a predicate of "the character following the space character" would form n-grams from the first character of consecutive words. A conditional n-gram that employs this predicate is discussed below in reference to FIG. 4. Because conditional n-grams are formed on a string of characters that fulfill the predicate condition, they are generated based on a subset of the total number of characters in the document and therefore generate fewer terms per document than conventional, non-conditional n-grams. Consequently, the degree of redundancy is reduced relative to non-conditional n-grams, thereby providing more effective indexing terms.

Figure 4:
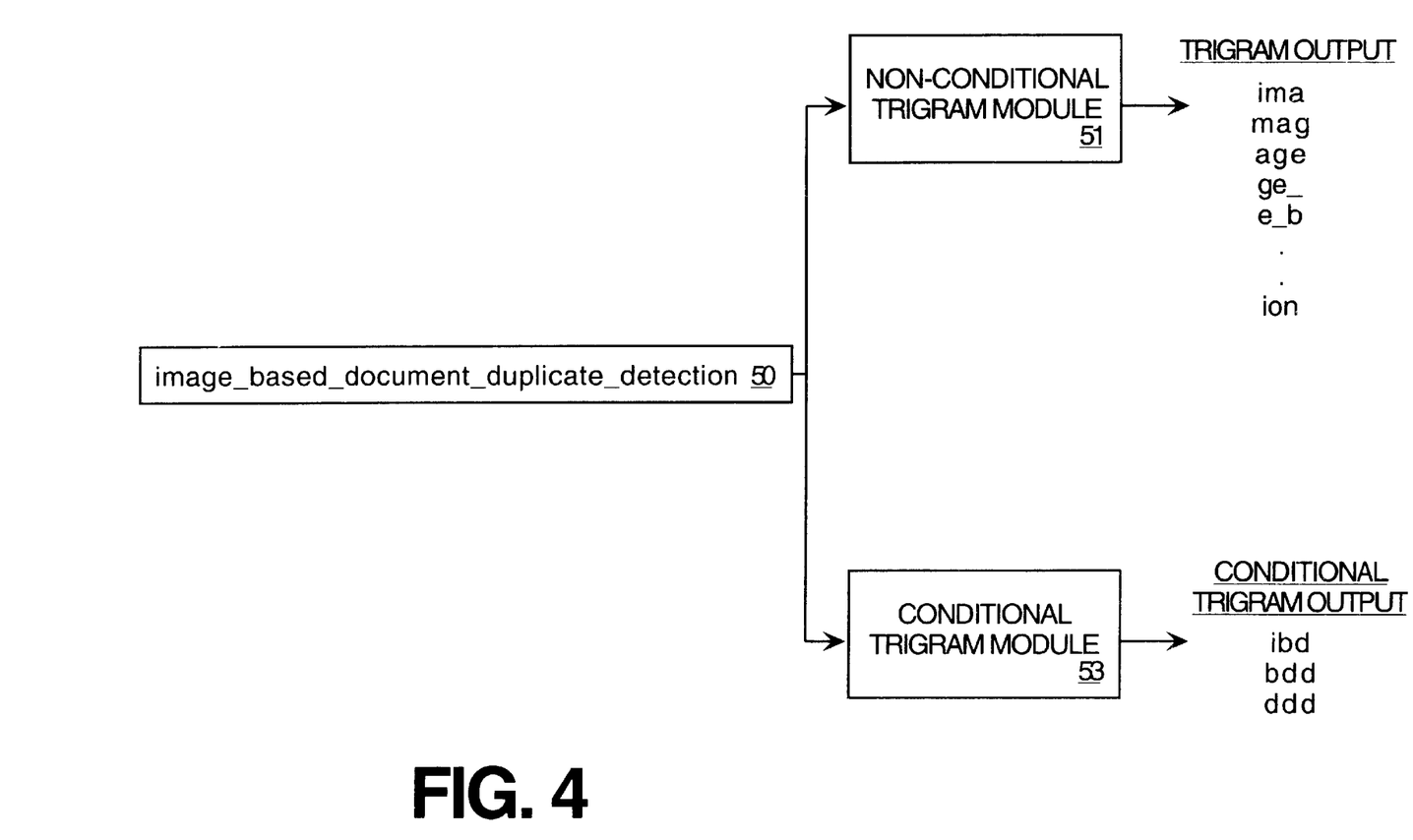
FIG. 4 compares conventional trigram generation with trigram generation achieved using conditional n-gram techniques.

FIG. 4 compares conventional trigram generation with trigram generation achieved using conditional n-gram techniques. The predicate condition used in the conditional n-gram technique is to select only characters that follow the space character for use in trigrams. The input text 50 is the phrase "image_based_document_duplicate_detection." The underscore symbol, '_,' is used to represent the space character. The conventional, nonconditional trigram module 51 generates the trigrams "ima, mag, age, ge_, e_b, . . . , ion" with each letter in the input text except the starting and ending pairs of letters appearing in three trigrams. The conditional trigram module 53, by contrast, selects only letters that follow space characters (including the initial 'i') so that significantly fewer trigrams are created. Using the exemplary input string 50, for example, only three trigrams, "ibd, bdd, and ddd," are generated by the conditional n-gram module 53. By contrast, the conventional n-gram module generates 38 trigrams. Also, because the sequence of characters that follow a space is usually less influenced by the statistics of a language, conditional n-gram generation based on the character after the space reduces the tendency to converge toward a language mean exhibited in conventional n-gram techniques. Although a particular predicate condition is illustrated in FIG. 4, numerous other predicates may be used for conditional n-gram generation in alternate embodiments. Examples of other predicates include, but are not limited to, using the characters that precede spaces in the text, using every nth character in the text, using characters found at predetermined spatial coordinates in the text (e.g., characters a certain distance from the top, bottom or sides of the document image) and so forth.

In one embodiment, the similarity of two documents generated using HMM-based deciphering and from which conditional n-grams have been extracted is measured by summing the dot products of their n-gram frequency vectors. That is, the number of occurrences of each n-gram in one of the documents is multiplied by the number of occurrences of the same n-gram in the other of the documents. These dot products are summed to provide a scalar measure of similarity between the documents. Documents which yield a dot product sum above a predetermined threshold are considered to be duplicates. In alternate embodiments, different measures of similarity may be generated and adaptive or dynamically determined thresholds may be used instead of predetermined thresholds.

Figure 5:
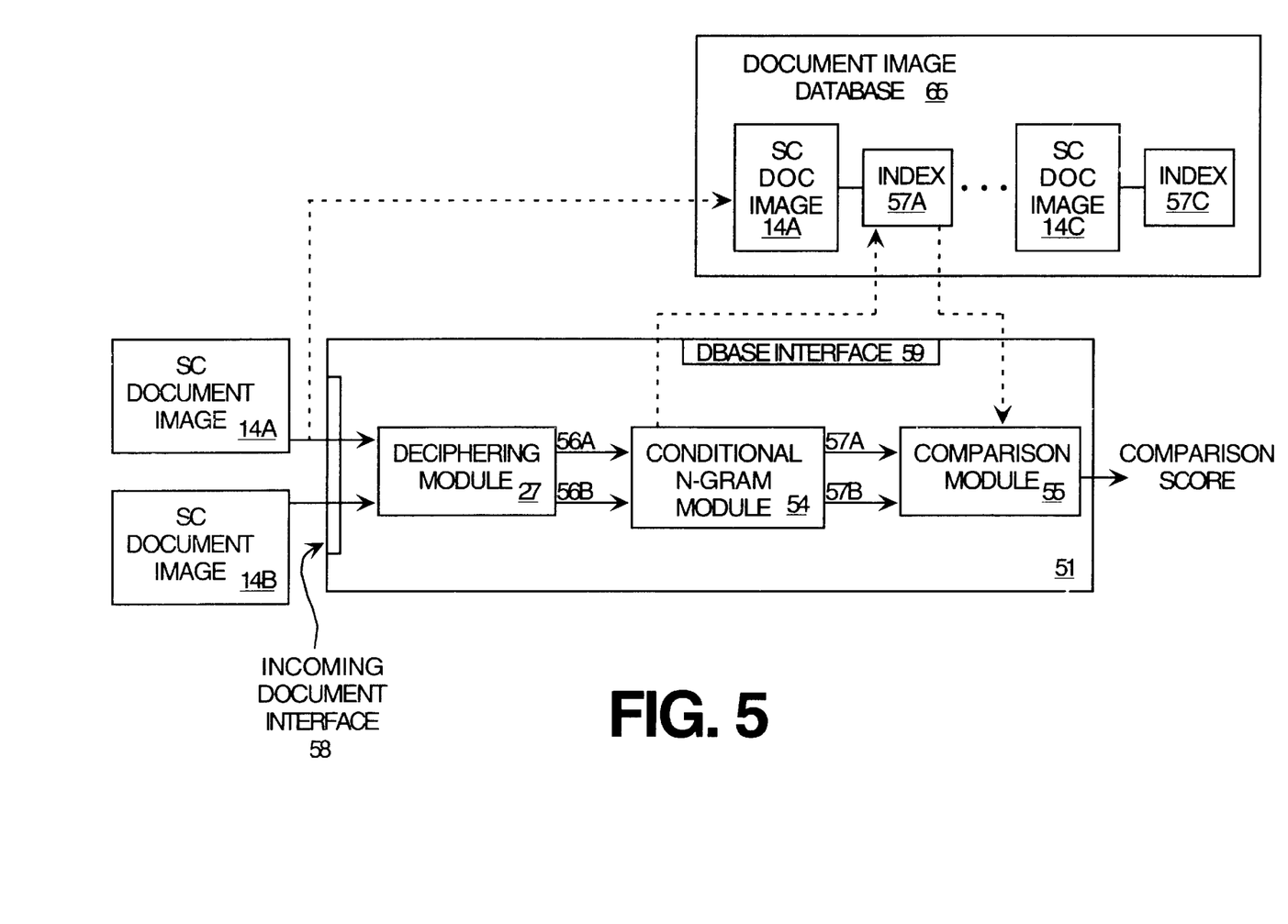
FIG. 5 is a canonical diagram of a document processing system according to one embodiment.

FIG. 5 is a canonical diagram of a document processing system 51 according to one embodiment. Symbolically compressed document images 14A, 14B are received via an incoming document interface 58, such as a network communications interface or a digital scanning and compressing unit of a copier or facsimile device. A deciphering module 27 deciphers the symbolically compressed document images 14A, 14B to generate respective deciphered results 56A, 56B (e.g., text strings). A conditional n-gram module 54 extracts respective sets of n-gram indexing terms 57A, 57B from the deciphered results and the n-gram indexing terms are supplied to a comparison module 55 which generates a comparison score, for example, by computing a dot product sum of the n-gram indexing terms 57A, 57B. The comparison score represents a measure of similarity between the symbolically compressed document images and may be used to support document matching in a variety of applications.

Still referring to FIG. 5, instead of processing the symbolically compressed document images 14A, 14B concurrently, the compressed document images may be processed at different times and one or both of the compressed document images 14A, 14B may be stored in a document image database 65 along with indexing terms previously extracted by the conditional n-gram module 54. For example, indexing terms 57A may be written to the document image database 65 via a database interface 59 and associated with symbolically compressed document image 14A. By this arrangement, previously extracted indexing terms are associated with symbolically compressed document images in the database 65 and are available for comparison with indexing terms extracted from an incoming symbolically compressed document image (e.g., 14B). In that case, the comparison module 55 generates a comparison score by comparing the previously generated and stored set of indexing terms obtained from the document image database 65 with indexing terms extracted from a deciphered incoming document image. Alternatively, both sets of indexing terms may be obtained from the document image database 65.

Figure 6:
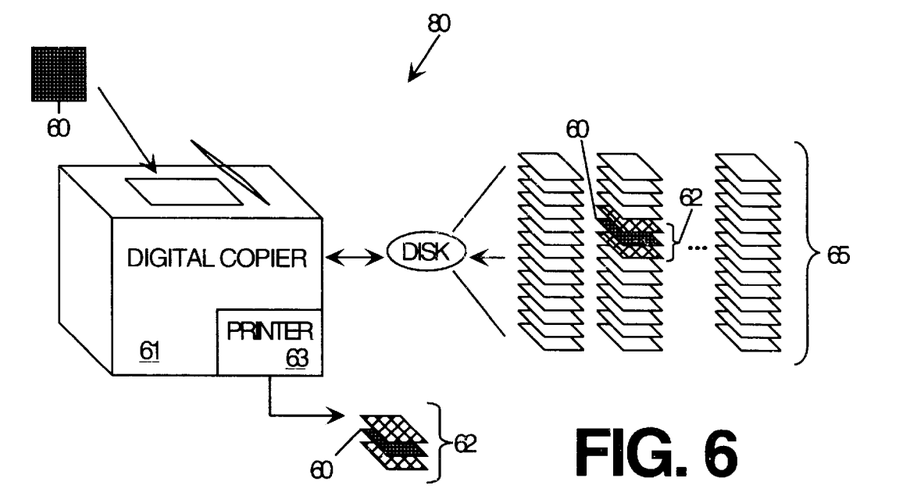
FIG. 6 illustrates a document copying system that employs document matching using conditional n-grams.

FIG. 6 illustrates a document copying system 80 that employs document matching using conditional n-grams. A query document 60 is copied by a digital copier 61 which recovers text from the document either using conventional OCR techniques or the above-described HMM-based deciphering technique (assuming, in the latter case, that the query document 60 is first symbolically compressed). The above-described conditional n-gram technique is then applied to generate indexing terms for the query document 60. Dot product sums are computed based on the n-gram frequency vectors from the query document 60 and from the documents in the database 65 until a document in the database 65 yields a dot product sum greater than a predefined threshold (scores may be generated for all database documents, with the document yielding the highest dot product sum being selected). If no such dot product sum is found, the query document 60 is deemed not to have a duplicate in the database 65 and may itself be stored in the database 65 for comparison with subsequent query documents. On the other hand, if a document in the database 65 yields a sufficiently high dot product sum, the document is deemed to match (i.e., be a duplicate of) the query document 60. Note that, in an alternate embodiment, HMM-based deciphering and conditional n-gram extraction may be performed as each new document is stored in the database 65. The conditional n-grams thus extracted may themselves be stored in the database 65 and associated with the symbolically compressed document from which they were obtained. In such an embodiment, the time required to perform document matching is reduced because the extracted n-grams are present in the database 65 and do not have to be generated in response to each new document copy request.

The ability to determine whether a document in the database 65 matches a document sought to be copied has a number of useful applications. For example, if the query document 60 is but a portion of a larger document 62 that is present in the database 65, then by simply submitting the query document 60 to the digital copier 61, the user may be informed that a larger encompassing document 62 exists and be prompted to select either to receive a hardcopy of the query document 60 or the entire encompassing document 62. Thus, the user may submit one or a few pages, for example, of a larger document, yet receive the entire document as an output (e.g., document 62 printed by printer 63). Further, because the document image database 65 may be sorted by numerous criteria (e.g., document content, creation time, author, etc.), location of a document that matches the query document 60 can be used to find other related documents. For example, the user may be prompted to select one of a number of database sorting criterion and then be presented with a list of documents related to the query document 60 (e.g., documents containing similar subject matter, authorship, storage date, etc.).

Other document processing tasks may also be performed using the document copying system 80. For example, document security may be enforced by determining whether the document sought to be copied matches a document in the database that is indicated to be confidential. If so, the individual requesting the copy may be required to supply a password or other information (e.g., a personal identifier such as fingerprint or a user code) to establish authorization to copy the confidential information. Depending on organizational needs, a hierarchy of confidential documents may be organized around such a system with each document in the database having an associated confidentiality rating which must be met by appropriate authorization level before being permitted to be copied.

In addition to protecting confidential documents, the document copying system 80 may also be used to prevent unauthorized copyright violation or even to automatically charge a license fee from the person seeking to copy the document. As with the confidential document protection discussed above, each document may also have an attribute indicating whether the document is protected by copyright and, if so, the identity of the copyright holder, the amount of the copyright license fee and other such information. In one embodiment, the copying system 80 may record each incident of copying copyrighted material and the identity of the copy requester in a database that is accessed from time to time to allow accounting for copyright license fees. Alternatively, the copying system may be connected via a telecommunication link (e.g., a computer network) to a copyright clearinghouse or similar commercial center for real-time notification of the requested copy. The copyright clearinghouse may then record the transaction and bill the copy requester electronically or using conventional invoicing techniques.

In addition to copyright and confidentiality protection, useful statistical information may also be recorded by the document copying system 80, including, for example, the number of times a given document has been copied, dates and identities of copying of confidential documents, the identities of persons copying confidential information, and so forth.

Figure 7:
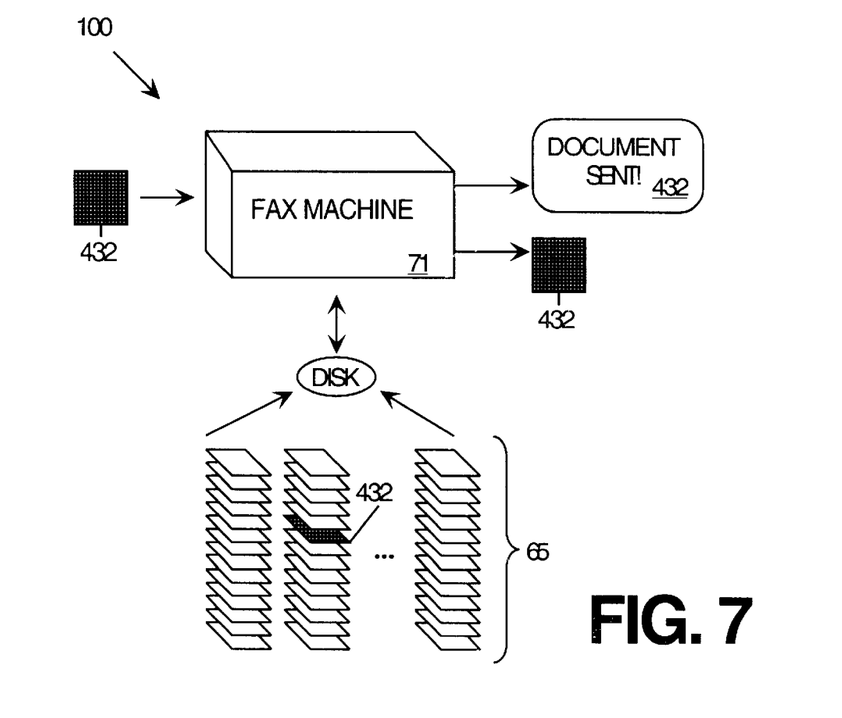
FIG. 7 illustrates a document faxing system that employs document matching using conditional n-grams.

FIG. 7 illustrates a document faxing system 100 that employs document matching using conditional n-grams. A query document 60 is submitted to a fax machine 71 for transmission to a remote party. As with the digital copier 61 described above, the fax machine 71 is coupled to a database 65 of symbolically compressed document images and document matching is performed using the above described techniques (e.g., generating dot product sums of conditional n-grams extracted from the document sought to be transmitted and documents in the database). In one embodiment, the database 65 contains confidential document images so that a determination that the document sought to be transmitted matches a confidential document in the database means that confidential or sensitive material is about to be transmitted. In one embodiment, user authorization is requested in response to such a determination and, if not forthcoming, transmission of the confidential information is denied. As FIG. 7 indicates, various types of alerts may also be issued. Also, the time and date of the transmission, the identity of the document transmitted and the identity of the individual requesting the transmission can be recorded for later inspection. The user identity may be determined, for example, by a code entered by the user to enable use of the faxing system 100 (e.g., an auditron or similar device).

Overview of a Processing System

Figure 8:
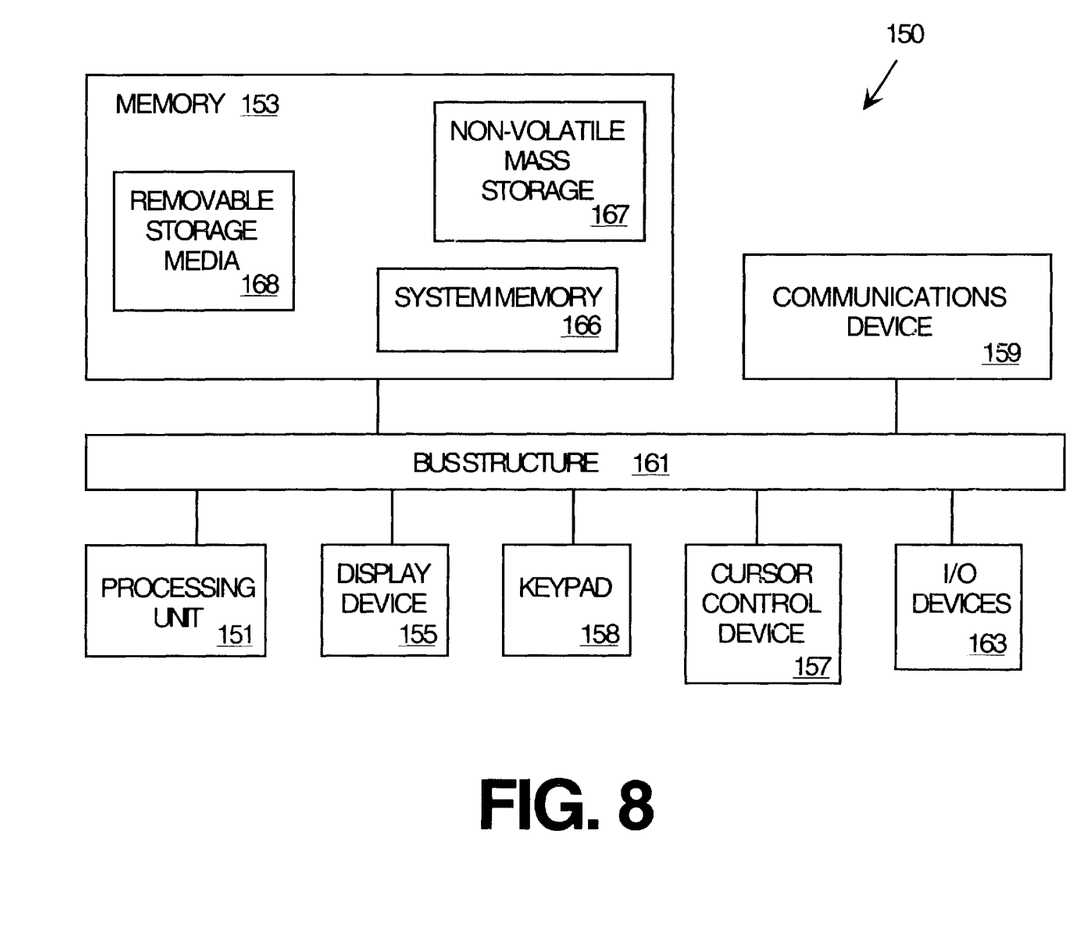
FIG. 8 is a block diagram of a processing system that can be used to perform processing operations used in embodiments of the present invention

FIG. 8 is a block diagram of a processing system 150 that can be used to perform processing operations used in embodiments of the present invention. The processing system 150 includes a processing unit 151, memory 153, display device 155, cursor control device 157, keypad 158, and communications device 159 each coupled to a bus structure 161. The processing system 150 may be a desktop or laptop computer or a workstation or larger computer. Alternatively, the processing system 150 may be a copy system, facsimile system, or other electronic system in which it is desirable to process symbolically compressed document images. The cursor control device 157 may be a mouse, trackball, stylus, or any other device for manipulating elements displayed on display device 155. The keypad 158 may be a keyboard or other device to allow a user to input alphanumeric data into the processing system 150. Other I/O devices 163 may be present according to the specific functions performed by the processing system 150.

The processing unit 151 may include one or more general purpose processors, one or more digital signal processors or any other devices capable of executing a sequence of instructions. The processing unit 151 may also be distributed among multiple computers of the processing system 150. When programmed with native or virtual machine instructions, the processing unit may be used to carry out the above-described HMM-based deciphering and conditional n-gram extraction operations as well as the language identification, document classification and document matching operations.

The communications device 159 may be a modem, network card or any other device for coupling the processing system 150 to a network of electronic devices (e.g., a computer network such as the Internet). The communications device may be used to generate or receive a signal that is propagated via a conductive or wireless medium. The propagated signal may be used, for example, for contacting sites on the World Wide Web (or any other network of computers) and for receiving symbolically compressed document images, updated program code or function-extending program code that can be executed by the processing unit to implement embodiments of the present invention.

In one embodiment, the memory 153 includes system memory 166, non-volatile mass storage 167 and removable storage media 168. The removable storage media may be, for example, a compact disk read only memory (CDROM), floppy disk or other removable storage device. Program code, including sequences of instructions for performing the above-described HMM-based deciphering and conditional n-gram extraction operations as well as the language identification, document classification and document matching operations, may be stored on a removable storage media that can be read by the processing system 150 and used to operate the processing system 150 in accordance with embodiments described herein. The non-volatile mass storage 167 may be a device for storing information on any number of non-volatile storage media, including magnetic tape, magnetic disk, optical disk, electrically erasable programmable read only memory (EEPROM), or any other computer-readable media. Program code and data and program code for controlling the operation of the processing system 150 in accordance with embodiments described herein may be transferred from the removable storage media 168 to the non-volatile mass storage 167 under control of an installation program. A database of document images may also be maintained in the non-volatile mass storage 167.

In one embodiment, when power is applied to the processing system 150, operating system program code is loaded from non-volatile mass storage 167 into system memory 166 by the processing unit 151 or another device, such as a direct memory access controller (not shown). Sequences of instructions comprised by the operating system are then executed by processing unit 151 to load other sequences of instructions, including the above-described program code for implementing embodiments of the present invention, from non-volatile mass storage 167 into system memory 166. Thus, embodiments of the present invention may be implemented by obtaining sequences of instructions from a computer-readable medium, including the above-described propagated signal, and executing the sequences of instructions in the processing unit 151.

Having described a processing system for implementing embodiments of the present invention, it should be noted that the individual processing operations described above may also be performed by specific hardware components that contain hard-wired logic to carry out the recited operations or by any combination of programmed processing components and hard-wired logic. Nothing disclosed herein should be construed as limiting the present invention to a single embodiment wherein the recited operations are performed by a specific combination of hardware components.

Experimental Results

The experimental performance of combining HMM-based deciphering with conditional n-gram generation to perform document comparison has been investigated. The HMM-based deciphering technique was trained with character transition probabilities calculated from a corpus of over 100,000 words of English.

The character deciphering rate (number of characters deciphered in a test document) as a function of the amount of text was first investigated for a perfect simple substitution cipher problem. The following table illustrates the character deciphering rates for various lengths of text used in perfect simple substitution ciphers:

| # of chars | 100 | 200 | 400 | 800 | 1200 | 1600 | 2000 |
| --- | --- | --- | --- | --- | --- | --- | --- |
| bigram | 57.55 | 72.73 | 93.19 | 96.74 | 99.13 | 99.13 | 99.56 |
| trigram | 66.47 | 90.17 | 98.80 | 99.01 | 99.44 | 99.54 | 99.76 |

The results show that a 99% deciphering rate is achieved with only 1200 characters of test data, using character bigram statistics. Similar performance is achieved with 800 characters of test data and trigram statistics. This illustrates the value of the additional contextual information present in trigrams.

The HMM-based deciphering technique was also tested on sequences of template identifiers extracted from a few synthetic images (i.e., document images rendered directly into electronic form, not obtained from hardcopy) and three all-text images in the University of Washington database. The mgtic algorithm (described in "Managing Gigabytes: Compressing and Indexing Documents and Images," by I. Witten, A. Moffat and T. Bell, Van Nostrand Reinhold, New York, 1994) was used to perform symbolic compression. Between 80% to 95% of the characters in the testing documents were correctly deciphered.

The performance of the conditional n-gram technique for document matching was tested on the 979 documents in the University of Washington (UW) database. This database contains 146 pairs of duplicate documents. Each member of a pair had been scanned from a different generation photocopy of the same document. Approximately 10% of the characters in the ground truth files (i.e., known correct information) for the UW database were corrupted to simulate a 90% correct decode rate by the HMM.

Conditional trigrams, as well as conventional trigrams and 5-grams were extracted from each of the 979 UW documents. Each document was compared to the other 978 documents by calculating a similarity score using a weighted sum of the frequencies of the n-grams they have in common. A sorted list of the 10 documents with the highest similarity scores was output, with the most similar document at the top of the list. Ideally, this top-of-the list document is a duplicate for the original document, if a duplicate exists in the database at all.

The following table compares duplicate detection rates and storage required for various conditional and non-conditional n-grams

| criterion | non-conditional trigrams | non-conditional 5-grams | conditional trigrams |
| --- | --- | --- | --- |
| Top 1 correct rate | 81.85% | 100% | 100% |
| Top 10 correct rate | 97.95% | 100% | 100% |
| Total number of n-grams indexed | 19,098 | 712,460 | 16,180 |

The "Top 1 correct rate" is the percentage of the 292 test documents with the highest similarity scores that are duplicates. Thus, the first row of the table shows how often the correct match is the first choice output by the comparison technique. The "Top 10 correct rate" is the percentage of documents with duplicates for which the duplicate was contained in the 10 documents with the highest similarity scores. The storage space required by each n-gram technique is indicated by the total number of n-grams indexed.

The results in the above table show that conditional trigrams provide a 100% correct rate in duplicate detection. This compares to the 81.85% correct rate achieved by non-conditional trigrams, in the first choice, and 97.95% in the top 10 choices. Non-conditional 5-grams also produced a 100% correct duplicate detection rate. However, this was at the cost of roughly a 40:1 increase in storage requirement (i.e., 712,460/16,180) in comparison to conditional trigrams and commensurately increased processing.

A method and apparatus for extracting information from symbolically compressed document images is thus disclosed. The technique is based on a novel deciphering approach that uses Hidden Markov Models. Although the error rate in the text recovered by HMM-based deciphering is normally higher than that by a conventional OCR system, it has been demonstrated that there is sufficient information for certain document processing tasks, including, without limitation, language identification, duplicate detection, keyword indexing and document security enforcement. A conditional n-gram based approach to information extraction that is particularly effective for detecting duplicate documents has also been disclosed.

Experimental results showed that HMM based deciphering can successfully decipher over 98% of the text in symbolically compressed English language document images that contain as few as 400 characters. When combined with conditional n-gram techniques, duplicates were successfully detected in a database of about 979 images.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
   representing an input document image as a symbolically compressed representation with a sequence of template identifiers;
   replacing the template identifiers with alphabet characters according to language statistics to generate a text string representative of text in the input document image; and
   extracting conditional n-gram indexing terms from the text string by selecting alphabet characters in the text stream that satisfy a predicate that indicates a subset of combinations of characters in the text string.

2. The method of claim 1 wherein the conditional n-grams are trigrams.

3. A The method of claim 1 wherein the predicate is a condition that substantially all selected characters follow respective spaces in the text string.

4. The method of claim 1 further comprising comparing the input document image with a plurality of symbolically compressed document images in a database based on the conditional n-gram indexing terms to determine whether one or the plurality of documents matches the input document image.

5. The method of claim 4 further comprising determining whether the one of the plurality of document images is a confidential document if the one of the plurality of document images matches the input document image.

6. The method of claim 5 further comprising prompting a user for authorization before operating on the input document image if the one of the plurality of document images matches the input document image and is a confidential document.

7. The method of claim 4 further comprising determining whether the one of the plurality of document images forms a sub-portion of an encompassing document image if the one of the plurality of document images matches the input document image.

8. The method of claim 4 further comprising prompting the user to select between hardcopy output of the one of the plurality of document images or the encompassing document image if the one of the plurality of document images matches the input document image and forms a sub-portion of a larger document image.

9. The method of claim 4 further comprising determining whether the one of the plurality of document images is copyrighted if the one of the plurality of document images matches the input document image.

10. The method of claim 1 wherein replacing the template identifiers with alphabet characters comprises replacing at least one of the template identifiers with an alphabet character selected according to a sequence of at least two alphabet characters selected to replace template identifiers that precede the at least one template identifier in the sequence of template identifiers.

11. The method of claim 1 wherein replacing the template identifiers with alphabet characters comprises replacing at least one of the template identifiers with an alphabet character selected according to a sequence of all alphabet characters selected to replace template identifiers that precede the at least one template identifier in the sequence of template identifiers.

12. The method of claim 1 wherein replacing the template identifiers with alphabet characters according to language statistics comprises replacing the template identifiers with alphabet characters selected according to a hidden Markov model.

13. The method of claim 1 wherein replacing template identifiers with alphabet characters according to language statistics comprises solving a substitution cipher by mapping the alphabet characters to the template identifiers based at least partly on frequency of occurrence of the template identifiers.

14. The method of claim 1 wherein the predicate that indicates a subset of combinations of characters in the text string comprises selecting only alphabet characters that follow a space in the text string.

15. A The method of claim 1 wherein the predicate that indicates a subset of combinations of characters in the text string comprises selecting only alphabet characters that precede a space in the text string.

16. The method of claim 1 wherein the predicate that indicates a subset of combinations of characters in the text string comprises selecting only every mth alphabet character.

17. The method of claim 1 wherein the predicate that indicates a subset of combinations of characters in the text string comprises selecting only alphabet characters at predetermined spatial locations within the document.

18. A document processing system comprising:
   a deciphering module to generate a first text string based on a sequence of template identifiers in a first symbolically compressed document image and to generate a second text string based on a sequence of template identifiers in a second symbolically compressed document image;
   a conditional n-gram module coupled to receive the first and second text strings from the deciphering module, the conditional n-gram module being configured to extract n-gram indexing terms from the first and second text strings based on a predicate condition that indicates a subset of combinations of characters in the text string; and a comparison module to generate a measure of similarity between the first and the second symbolically compressed document image based on the indexing terms extracted by the conditional n-gram module.

19. The document processing system of claim 18 wherein at least one of the deciphering module and the conditional n-gram module is implemented by a programmed processor.

20. The document processing system of claim 18 wherein the deciphering module generates the first text string by applying a hidden Markov model to the sequence of template identifiers in the first symbolically compressed document image.

21. The document processing system of claim 18 wherein the second symbolically compressed document image is obtained from a database of symbolically compressed document images.

22. The document processing system of claim 18 wherein the data processing system further comprises a scanning and compressing module that is configured to generate a digitized version of a source document and to perform symbolic compression of the digitized version to produce the first symbolically compressed document image.

23. The document processing system of claim 22 wherein the document processing system is a document copying system.

24. The document processing system of claim 22 wherein the document processing system is a facsimile transmission system.

25. The document processing system of claim 18 further comprising a second interface to couple the document processing system to a database of symbolically compressed document images and associated indexing terms, and wherein the conditional n-gram module is configured to store the n-gram indexing terms extracted from the second text string in the database.

26. The document processing system of claim 25 wherein the comparison module is configured to receive the n-gram indexing terms extracted from the first text string from the conditional n-gram module and to receive the n-gram indexing terms extracted from the second text string from the database via the second interface.

27. The document processing system of claim 18 wherein the measure of similarity is used to determine whether the first and second symbolically compressed document images match.

28. The document processing system of claim 27 wherein the data processing system further comprises a user interface to prompt a user to select between a decompressed version of the first symbolically compressed document image and a decompressed version of a third symbolically compressed document image that encompasses the second symbolically compressed document image if the first and second symbolically compressed document images match, the document processing system further comprising an output module to output the decompressed version of the first symbolically compressed document image or the decompressed version of a third symbolically compressed document image according to input received via to user interface.

29. The document processing system of claim 27 wherein the data processing system further comprises a security module to determine if the second symbolically compressed document image is a confidential document based on attribute information associated with the second symbolically compressed document image, the security module being configured to prompt a user to enter authorization information before permitting output of the first symbolically compressed document image if the second document image is a confidential document and if the first and second document images match.

30. The document processing system of claim 29 further comprising a printer configured to receive a signal from the security module indicating whether to print a decompressed version of the first symbolically compressed document image.

31. The document processing system of claim 29 further comprising an transmission module to receive a signal from the security module indicating whether to transmit the first symbolically compressed document image.

32. The document processing system of claim 27 wherein the data processing system further comprises an monitoring module to determine if the seconds symbolically compressed document image is a copyrighted document.

33. The document processing system of claim 32, wherein the monitoring module is configured to automatically charge a copyright license fee for output of a decompressed version of the first symbolically document image if the second symbolically compressed document image is a copyrighted document and if the first and second symbolically compressed document images match.

34. The document processing system of claim 18 wherein the predicate condition that indicates a subset of combinations of characters in the text string comprises selecting only alphabet characters that follow a space in the text string.

35. The document processing system of claim 18 wherein the predicate condition that indicates a subset of combinations of characters in the text string comprises selecting only alphabet characters that precede a space in the text string.

36. The document processing system of claim 18 wherein the predicate condition that indicates a subset of combinations of characters in the text string comprises selecting only every mth alphabet character.

37. The document processing system of claim 18 wherein the predicate condition that indicates a subset of combinations of characters in the text string comprises selecting only alphabet characters at predetermined spatial locations within the document.

38. An article of manufacture including one or more computer-readable media that embody a program of instructions to generate a text string from an input document image as a symbolically compressed representation with a sequence of template identifiers, wherein the program of instructions, when executed by one or more processors in one or more processing systems, causes the one or more processors to replace the template identifiers with alphabet characters according to language statistics to generate a text string representative of text in the input document image and to extract one or more conditional n-gram indexing structures from the text string by selecting alphabet characters in the text string that satisfy a predicate that indicates a subset of combinations of characters in the text string.

39. The article of claim 38 wherein the one or more computer-readable media include one or more non-volatile storage devices.

40. The article of claim 38 wherein the one or more computer-readable media include a propagated data signal.

41. The article of claim 38 where in n comprises being an integer.

* * * * *